J. F. THOMAS & J. HANEY.
GRADING SCRAPER.
APPLICATION FILED DEC. 13, 1912.
1,061,144.
Patented May 6, 1913.
2 SHEETS—SHEET 1.
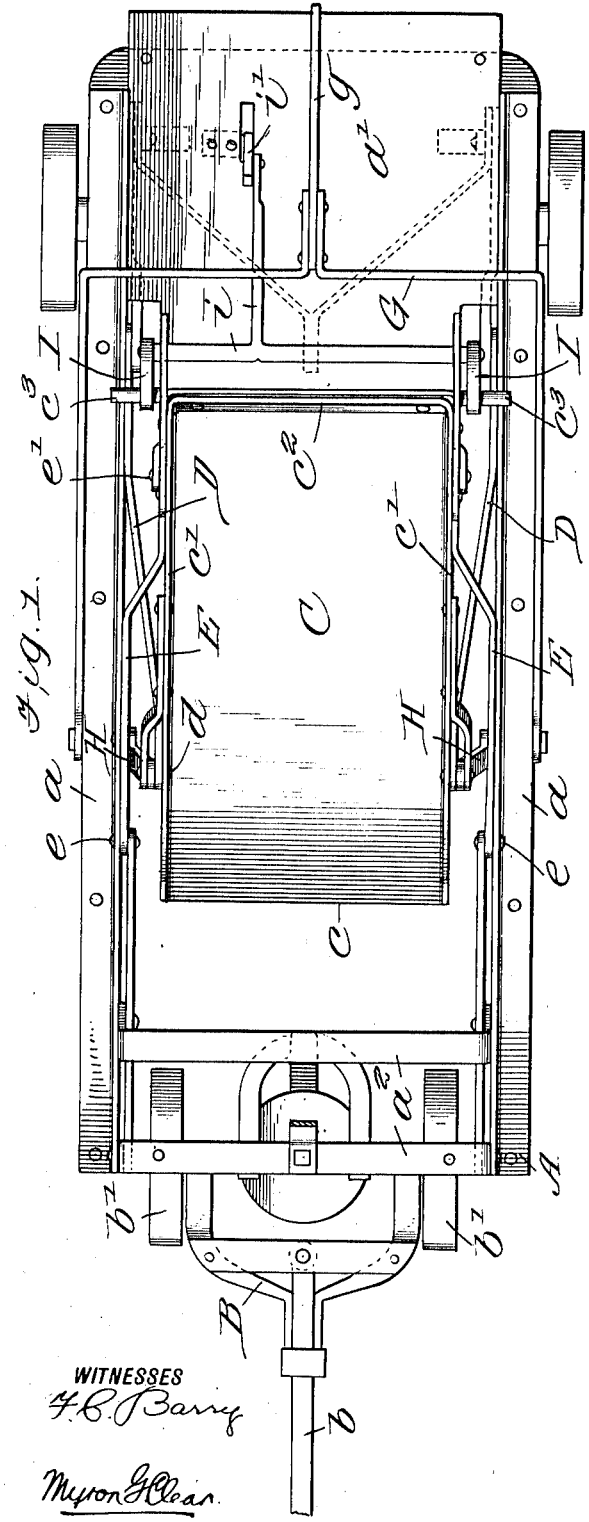
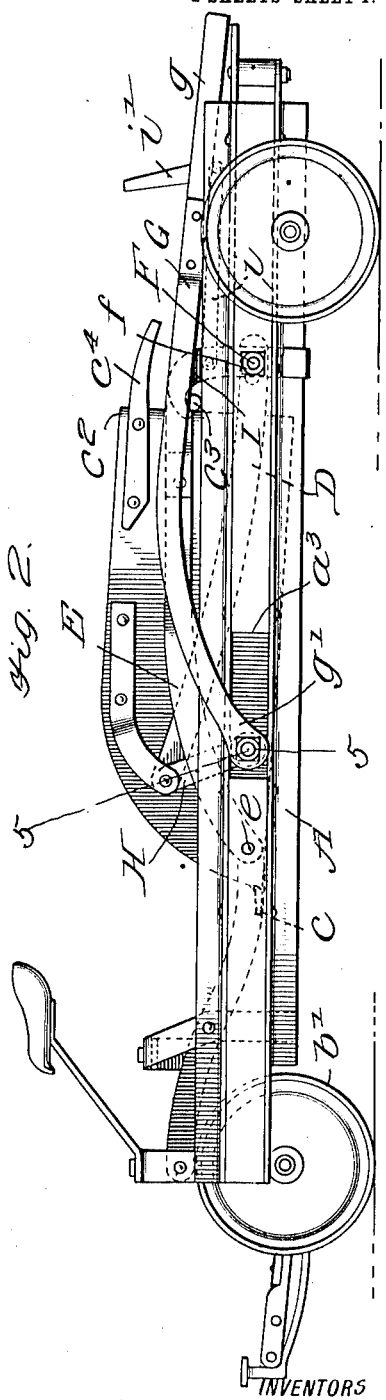
WITNESSES
INVENTORS
James F. Thomas
John Haney
BY
ATTORNEYS

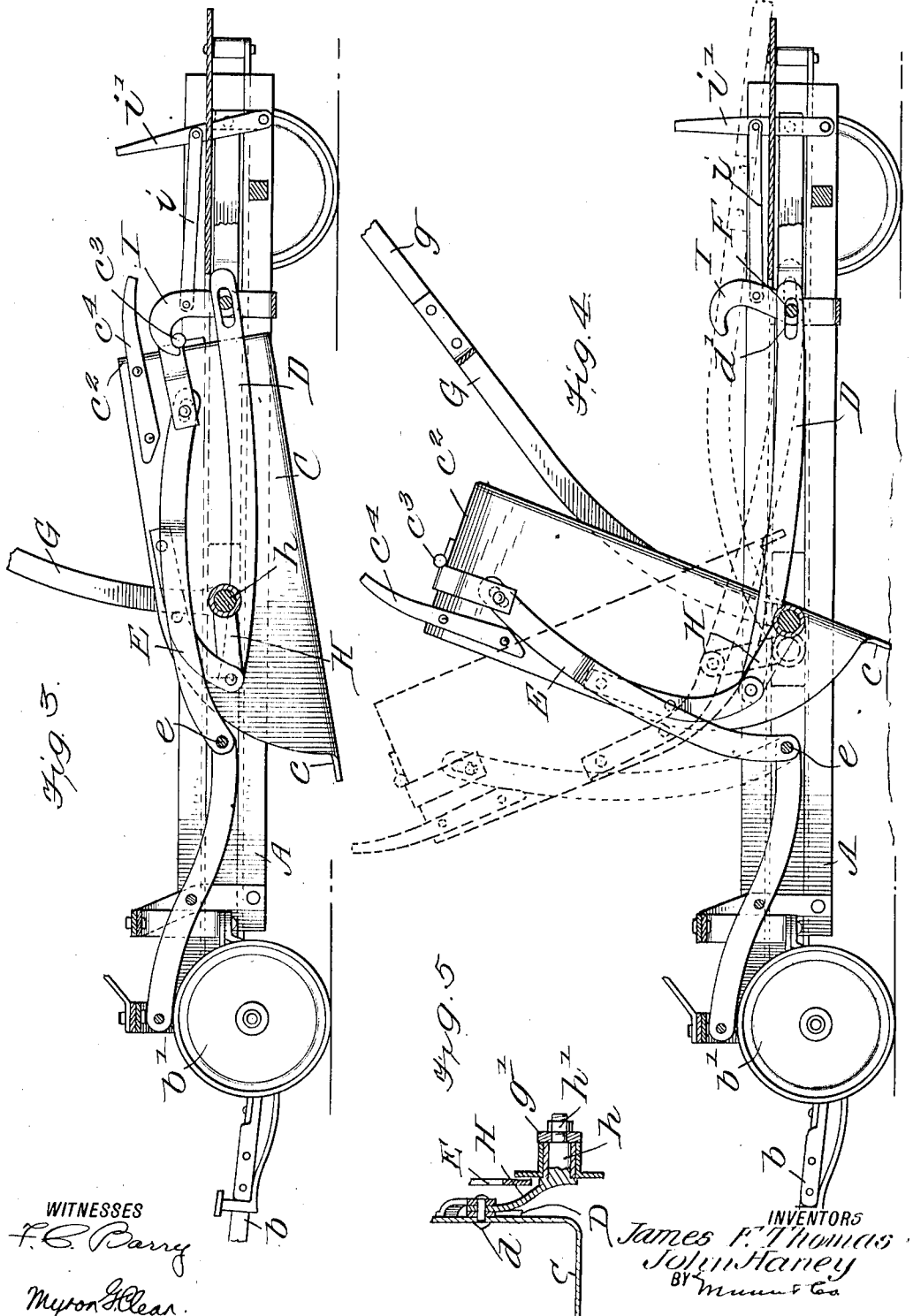

UNITED STATES PATENT OFFICE.

JAMES F. THOMAS AND JOHN HANEY, OF ODESSA, MINNESOTA.

GRADING-SCRAPER.

1,061,144. Specification of Letters Patent. Patented May 6, 1913.

Application filed December 13, 1912. Serial No. 736,510.

*To all whom it may concern:*

Be it known that we, JAMES F. THOMAS and JOHN HANEY, citizens of the United States, and residents of Odessa, in the county of Bigstone and State of Minnesota, have made certain new and useful Improvements in Grading-Scrapers, of which the following is a specification.

Our present invention relates to grading scrapers, our object being to provide a wheeled frame and a shovel scraper adjustably mounted in the frame in such manner that it may be caused to scrape and remove the surface of the soil beneath the frame when the latter is moved, and may be further adjusted to a position wherein its contents may be either dumped as a whole or gradually leveled out after transportation to a desired point.

With these objects in view our invention resides in the particular construction and arrangement and operation to be now described with respect to the accompanying drawings, forming a part of this specification and in which—

Figure 1 is a plan view of our improved invention. Fig. 2 is a side elevation, the parts being in their normal inoperative position. Fig. 3 is a sectional side elevation illustrating the shovel scraper adjusted into operative position for scraping the surface of the soil. Fig. 4 is a similar view illustrating the two dumped positions, the position in which the contents of the shovel scraper are leveled out being shown in full lines, and that position in which the contents are simultaneously dumped, being shown in dotted lines, and Fig. 5 is a detail section taken substantially on the line 5—5 of Fig. 2.

Referring now to these figures, A designates the frame of our improved machine, which is generally rectangular and comprises side bars $a$ connected at their rear ends by means of a platform $a'$ adapted to support the operator, and further connected at their forward ends by transverse beams $a^2$ which support the fifth wheel of the forward truck B, carrying a pole $b$ and wheels $b'$. The intermediate portion of the frame, between the forward transverse supports $a^2$ and the rear platform $a'$ is open and in this space is disposed a shovel scraper C, this scraper being formed with a forward operating lip $c$, sides $c'$, and a rear wall $c^2$, and being provided upon the said rear wall with side extensions $c^3$ which are adapted to rest upon the upper surface of the frame sides $a$ at the forward edge of the platform $a'$ substantially as shown in Fig. 1.

At each side of the shovel scraper C are arranged crossing braces or levers D and E, the forward end of the brace or lever D being pivotally connected at $d$ to the scraper adjacent its forward end and extending rearwardly and having a longitudinal slot $d'$ through which extends a transverse shaft F which extends transversely between and through the frame sides $a$ below the forward end of the platform $a'$, the ends of this shaft being secured by exterior nuts $f$. The forward end of the brace or lever E is pivotally secured at $e$ to the respective frame side $a$ and its rear end is pivotally connected at $e'$ to the scraper side adjacent its rear wall $c^2$. Thus it may be seen that the shovel C will be supported in such a manner as to permit of its swinging adjustment as clearly illustrated by comparison of Figs. 2, 3 and 4. In order to effect this adjustment the U-shaped lever frame G is provided with a central handle $g$ extending over the platform $a'$ and having each of its forward extremities $g'$ rigidly connected, by a nut $h'$, upon a stud $h$ which works through a longitudinal slot $a^3$ in the frame side $a$ and constitutes an angular extension of a lever arm H, the opposite end of which is pivotally connected at the point $d$ at which the forward end of the brace or lever D is also connected as before described. Thus in the normal lowered position of the lever frame G, the forward portion of the shovel scraper C is raised to the position shown in Fig. 2. When it is desired, however, to lower the lip $c$ into engagement with the surface of the soil, the lever frame G is raised to the position shown in Fig. 3, forcing the forward end of the shovel scraper downwardly.

In order to prevent raising the rear end of the shovel scraper, a pair of upright hook members I are connected by a lever $i$ having a handle $i'$ said members being pivotally mounted at their lower ends upon the shaft F before mentioned and being movable by means of the lever $i$ and its handle so as to engage over the rear side extensions $c^3$ of the shovel scraper as clearly illustrated in the first three figures. Thus in the position shown in Fig. 3 wherein the scraper is engaged with the surface of the soil so that upon forward movement of the wheeled frame A, the material is scraped up into the shovel C, the hook members I prevent accidental displacement of the parts. As soon as the shovel has filled with material the lever frame is again lowered raising the shovel scraper to position shown in Fig. 2 and the material may be then transported to any desired point where it is to be dumped. In dumping the handle $i'$ is first moved rearwardly whereby to disengage the hook members I from the shovel extension $c^3$, and the lever frame G is then raised so as to lower the forward end of the scraper. If it is desired to level out the material from the shovel, the shovel handle $c^4$ is grasped and the shovel raised to the position shown in full lines in Fig. 4, during the continued travel of the wheeled frame. It will thus be seen that as the material discharges from the lower end of the shovel it will be leveled out upon the surface of the ground by the lower shovel edge. If on the other hand it is desired to simultaneously dump the material the shovel handles $c^4$ are grasped and the shovel moved to the position shown in dotted lines in Fig. 4 and in this position it will be noted that the material will be simultaneously discharged in case the leveling out is not desired.

We claim;

1. In a scraper and grader, the combination of a wheeled frame, a shovel scraper disposed in the frame and having side extensions at its rear end resting on the frame sides, a latch mechanism movable to engage and disengage said shovel extensions, means for raising and lowering the forward portion of the scraper, and braces pivotally connecting the scraper to the frame and upon which the scraper may be wholly or partially inverted for dumping when the latch mechanism is released.

2. In a scraper and grader, the combination of a wheeled frame, a shovel scraper disposed in the frame and having side extensions at its rear end resting on the frame side, a latch mechanism movable to engage and disengage said shovel extensions, a lever mounted on the frame and having a pivotal connection with the said shovel scraper adjacent its forward end, braces pivotally connecting the scraper to the frame and handles carried by the scraper.

3. In a scraper and grader, the combination of a wheeled frame, a shovel scraper disposed in the frame and having side extensions at its rear end resting on the frame sides, vertical latch members pivoted in the frame, a lever mounted on the frame and having connection with said latch members whereby to cause the same to engage and disengage said shovel extensions, means for raising and lowering the forward portion of the scraper, and braces pivotally connecting the scraper to the frame.

4. In a scraper and grader, the combination of a wheeled frame embodying slotted side members, a shovel scraper mounted in the frame, latching means movable to engage and disengage the rear portion of the scraper, braces pivotally connecting the scraper to the frame, and a lever having connections working in the said frame side slots and pivotally connected with the forward portion of the scraper whereby to raise and lower the same.

5. In a scraper and grader, the combination of a wheeled frame having slotted sides, studs working in the said side slots, a shovel scraper disposed in the frame lever arms pivotally connected at one end to the forward portion of the said scraper and rigidly connected at their opposite ends to the said studs, braces pivotally connecting the scraper with the frame, latching means mounted on the frame and movable to engage and disengage the rear portion of the scraper, and a U-shaped lever having its extremities rigidly connected to the said studs.

6. In a scraper and grader, the combination of a wheeled frame, a shovel scraper disposed in the frame, braces pivotally connected at their rear ends to the rear side portions of the scraper and at their forward ends to the frame sides, other braces pivotally connected at their forward ends to the forward portion of the scraper and at their rear ends to the frame and crossing the first named braces, latching means movable to engage the rear portion of the scraper, and means having pivotal connection with the forward portion of the scraper for raising and lowering the same.

JAMES F. THOMAS.
JOHN HANEY.

Witnesses:
J. C. GANS,
P. H. THOMAS.